(12) United States Patent
Ben Dayan et al.

(10) Patent No.: US 12,707,127 B1
(45) Date of Patent: Aug. 11, 2026

(54) LIVE STREAM PROCESSING AND SENSOR-BASED MEASUREMENT PRESENTATION THEREIN

(71) Applicant: Amazon Technologies, Inc., Seattle, WA (US)

(72) Inventors: Shachar Flora Ben Dayan, Tel Aviv (IL); Noah Lirone Sarfati, Tel Aviv-Jaffa (IL); Yotam Elor, Raanana (IL); Ido Yerushalmy, Tel-Aviv (IL); Sam Schwartzstein, Palo Alto, CA (US); Alex Strand, Los Angeles, CA (US); Ianir Ideses, Raanana (IL)

(73) Assignee: Amazon Technologies, Inc., Seattle, WA (US)

( * ) Notice: Subject to any disclaimer, the term of this patent is extended or adjusted under 35 U.S.C. 154(b) by 65 days.

(21) Appl. No.: 18/520,246

(22) Filed: Nov. 27, 2023

Related U.S. Application Data

(60) Provisional application No. 63/589,214, filed on Oct. 10, 2023.

(51) Int. Cl.

| | |
|---|---|
| ***H04N 21/81*** | (2011.01) |
| ***H04N 21/2187*** | (2011.01) |
| ***H04N 21/234*** | (2011.01) |
| ***H04N 21/235*** | (2011.01) |
| ***H04N 21/431*** | (2011.01) |

(52) U.S. Cl.
CPC ..... *H04N 21/8133* (2013.01); *H04N 21/2187* (2013.01); *H04N 21/23418* (2013.01); *H04N 21/235* (2013.01); *H04N 21/4312* (2013.01)

(58) Field of Classification Search
CPC .. H04N 21/4781; H04N 21/47; H04N 21/431; H04N 13/366; H04N 21/2187
See application file for complete search history.

(56) References Cited

U.S. PATENT DOCUMENTS

| | | | | |
|---|---|---|---|---|
| 10,384,133 B1 * | 8/2019 | Aghdaie | ................. | A63F 13/67 |
| 11,058,948 B1 * | 7/2021 | Hardiman | ............. | A63F 13/798 |
| 2007/0004516 A1 * | 1/2007 | Jordan | .................... | A63F 13/65 463/42 |

(Continued)

OTHER PUBLICATIONS

Forristal, "Amazon Brings New AI-driven Features to Thursday Night Football," TechCrunch, Available online at: https://techcrunch-com.cdn.ampproject.org/c/s/techcrunch.com/2023/08/24/amazon-prime-video-ai-features-thursday-night-football/amp/, Aug. 24, 2023, pp. 1-6.

*Primary Examiner* — Jason Salce
(74) *Attorney, Agent, or Firm* — Kilpatrick Townsend & Stockton LLP

(57) ABSTRACT

Techniques for live stream processing and sensor-based measurement presentation therein are described. In an example, a computer system determines, in-real time relative to a player being in a space, real-time data of the player. The real-time data is generated during a play in the space. The computer system generates, during the play, an input to an artificial intelligence model based on the real-time data. The computer system determines an output of the artificial intelligence model. The output is based on the input and indicates a prediction of an action to be performed by the player during the play. The computer system causes, based on the prediction, a presentation of a user interface element during the play, the user interface element indicates the prediction.

20 Claims, 12 Drawing Sheets

(56) References Cited

U.S. PATENT DOCUMENTS

| | | | | |
|---|---|---|---|---|
| 2008/0268943 | A1* | 10/2008 | Jacob | A63F 13/10<br>463/43 |
| 2009/0295086 | A1* | 12/2009 | Needle | A63F 3/0615<br>273/277 |
| 2012/0270618 | A1* | 10/2012 | Abramoff | G07F 17/3288<br>463/9 |
| 2018/0015370 | A1* | 1/2018 | Sorek | A63F 13/67 |
| 2019/0273954 | A1* | 9/2019 | Evans | H04N 21/25883 |
| 2021/0394073 | A1* | 12/2021 | Osman | A63F 13/87 |
| 2022/0308654 | A1* | 9/2022 | Chen | A63F 13/65 |
| 2025/0061636 | A1* | 2/2025 | Fox | G06F 3/016 |

* cited by examiner

GUI 500A likelihood = 0.8, and threshold = 0.6

GUI 500B likelihood = 0.5, and threshold = 0.3

GUI 500C likelihood = 0.2, and threshold = 0.3

LIVE STREAM PROCESSING AND SENSOR-BASED MEASUREMENT PRESENTATION THEREIN

CROSS-REFERENCE TO RELATED APPLICATIONS

This application claims the benefit of and priority to U.S. Provisional Application No. 63/589,214, filed Oct. 10, 2023, and entitled "LIVE STREAM PROCESSING AND SENSOR-BASED MEASUREMENT PRESENTATION THEREIN," the contents of which are hereby incorporated by reference in their entireties for all purposes.

BACKGROUND

Online services may facilitate recording an event and distributing a video feed of the event to user devices. In some cases, the event may involve various activities (e.g., people and/or objects moving around), and the video feed may capture these activities from the perspective of a camera that records the video feed. For example, consider a case in which a camera is positioned (e.g., at mid-field) to record a sporting event (e.g., a football game in a stadium). In this example, the camera may record activities occurring within the game (e.g., passing the football, running down field, etc.) from a mid-field vantage point. Accordingly, the camera may transmit the video feed to a video distribution service (e.g., a television (TV) studio), which in turn streams it to user devices such that user may watch the video feed of the game from the vantage point of the camera.

BRIEF DESCRIPTION OF THE DRAWINGS

Various embodiments in accordance with the present disclosure will be described with reference to the drawings, in which.

DETAILED DESCRIPTION

Figure 1:
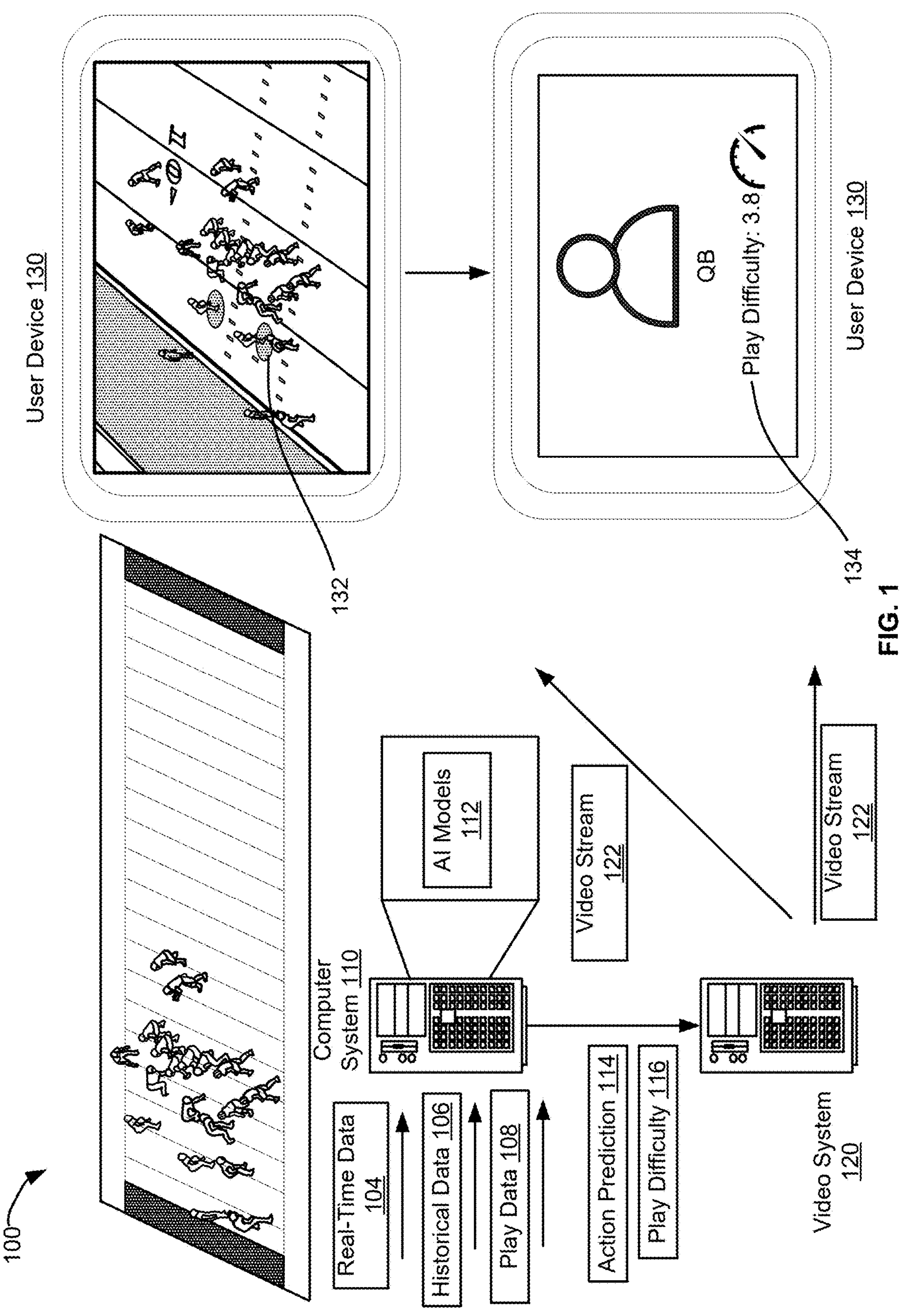
FIG. 1 is a schematic diagram illustrating an example environment for live stream processing and sensor-based measurement presentation, in accordance with an embodiment of the disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments described herein are directed to, among other things, techniques for live stream processing and sensor-based measurement presentation therein. From data generated during a live stream, a computer system can generate action predictions and play difficulty determinations that can be presented at a graphical user interface (GUI) on a user device. For instance, the computer system can receive real-time data (e.g., sensor data) and historical data (e.g., player statistics) during a play of the live video stream and generate an input to an artificial intelligence (AI) model based on the data. The AI model can output a prediction that a player is going to perform an action. A GUI element can then be presented showing the live video stream and showing, in association with the player, an indication of the prediction during the play. In addition, after the play, the computer system can receive data associated with the play to generate an input to another AI model. In turn, this AI model can output an indication of a difficulty of the play. A difficulty measurement for a player can be determined from the output and the difficulty measurement can be presented in the live video stream as another GUI element.

To illustrate, consider an example of a live football game being streamed to user devices. During a play of the game, a first team is on offense and a second team is on defense. As the play begins, a computer system processes sensor data (e.g., player acceleration, velocity, position, etc.) associated with each player on the field and the ball as well as historical statistical data associated with the players to generate vectors for the different players and the ball, where each vector can include the corresponding data of the player or the ball. The vectors are input to an AI model that outputs a prediction about whether any defensive players are likely to blitz the quarterback. The AI model may predict that a linebacker is likely to blitz the quarterback. So, the computer system can instruct a remote video system to highlight the linebacker to indicate that they are likely to blitz. This prediction can be generated in real-time and continuously during the play such that to control the highlighting of the linebacker. Once the play is over, another AI model receives play data and outputs a difficulty of the play between one and five. The computer system then determines a difficulty measurement for the quarterback, which may be the difficulty of the play or a combination of the difficulties of multiple plays in the game. The computer system can instruct the remote video system to present the difficulty measurement in the live video stream and before the next play begins.

Embodiments described herein provide several technical advantages over conventional techniques. For example, techniques are enabled for real-time processing and presentation of AI model outputs in a live video stream. Since the action prediction of an AI model is to occur in real time (e.g., within milliseconds) during a play, and a GUI element associated with the prediction is to be presented during the play, the embodiments enable reducing at least network latency for generating such predictions. For example, the AI model can be hosted on an on-premise computer system. The AI model can be configured for short time processing, thereby contributing to the reduction of the overall latency. Sensor data associated with players and generated during the game may be received and processed by the on-premise computing system, to reduce the latency of the system. Furthermore, the embodiments prevent GUI presentations from continuously changing during the live video stream by implementing rules, which enhances a user experience for viewing the live stream.

Illustrated examples are provided in association with live stream videos of football games, where actions are predicted in association with football players during plays of the game, and play difficulties are determined for the plays. However, aspects of the disclosure are not limited to football, but may apply to live stream videos of any sport or activity. For instance, embodiments may be used to predict where a soccer player will direct a penalty kick, how a golf player will hit a ball, etc. In addition, while aspects are described in relation to processing data associated with multiple players, aspects of the disclosure can also relate to data associated with a single player. In such cases, an action is predicted for the player irrespective of other players.

FIG. 1 is a schematic diagram illustrating an example environment for live stream processing and sensor-based measurement presentation, in accordance with an embodiment of the disclosure. In the upper left portion of FIG. 1, a physical topography 100 (e.g., a football field) is depicted, in this example, as an environment for playing sports. The physical topography 100 can represent a space where an activity is performed. For instance, in other examples the physical topography 100 may be a field, court, ski mountain, swimming pool, etc. In FIG. 1, a football game is depicted as being in progress. Within this football game, one or more objects may be in motion (e.g., players within the match, a football, etc.). The football game may be being live streamed by a video service, such that the football game is viewable via user devices (e.g., televisions, laptops, desktops, smartphones, etc.) in real time.

Turning to the lower portion of FIG. 1, a computer system 110 is depicted, which may be located at any suitable location. For example, the computer system 110 may be an on-premise system that is located near the physical topography 100 or in a remote location (e.g., in a remote cloud computing location). since this is a claim term, please provide additional description in the spec of what this means from a technical perspective and why it is important. In an example, an on-premise system includes a computer system that is permanently or temporarily (e.g., for at least the duration of an event) installed in the space or nearby the space where the event is occurring. Nearby can be a geographical distance within which a network latency is acceptable (e.g., less than one second between the time event data is generated and the time the computer system receives the data). Using an on-premise system can reduce the overall processing latency such that the output of the system can be provided in real-time or near-real time. In one example, an on-premise system is deployed on a vehicle (e.g., a production truck) and thus is movable. In such an example, certain production trucks have a limited space and power consumption and, thus, have a limited compute resources (e.g., compute power) and/or memory resources (e.g., as compared to the compute power and/or memory of an off-site cloud computing service/system). To overcome these issues, certain examples herein are directed to a service/system that utilizes an ML model that is implemented using minimal compute resources and/or minimal memory resources (e.g., the compute and memory resources of a production truck) for example, while still running at full resolution (e.g., without skipping any frames of the video) and in real time.

In some embodiments, the computer system 110 may include one or more server computers and/or server clusters (e.g., of a cloud computing service). In some embodiments, computer system 110 is communicatively connected (e.g., via a suitable wireless medium) to sensor units associated with the players and the football. As describe herein, each of these sensor units may be configured to transmit data (e.g., in real-time) to the computer system 110. In some embodiments, any one or more intermediate computing devices (e.g., switches and/or routers) may be used to relay sensor data from a sensor unit to the computer system 110.

The computer system 110 receives real-time data 104 associated with objects during the football game. For instance, the real-time data 104 may include sensor data received from sensors physically attached to the players and to the football. The sensor data can indicate position, velocity, acceleration, direction, etc., and, possibly, can be generated by multiple sensors attached to multiple locations on the player or the player's uniform so relative measurements can be taken. Any sensor data can be only collected and generated when proper permissions (e.g., those of the player) are obtained. Collection, storage and/or use of data related to a particular person or device may be controlled by a user (e.g., a player) using privacy controls associated with a device and/or a companion application associated with the device.

Accordingly, users may opt out of collection and storage of data and/or may select particular types of data that may be collected while preventing aggregation and storage of other types of data. Additionally, collection, aggregation, storage, and use of information, as described herein, may be compliant with privacy controls, even if not technically subject to them, to bolster user trust. For example, data described herein may be treated as if it fell under acts and regulations, such as the Health Insurance Portability and Accountability Act (HIPAA) and the General Data Protection Regulation (GDPR), even if it does not actually fall under these acts and regulations.

The real-time data 104 may additionally include information generated by feeding the live stream into a computer vision model. For example, the real-time data 104 may include features such as player stance, feet positions, etc. The computer system 110 can receive the real-time data 104 about each player on the field during a play being performed. In addition to the real-time data 104, the computer system 110 can also receive historical data 106 associated with players on the field during the play. For instance, a quarterback and a linebacker may be on the field, so the computer system 110 can receive the historical data 106 about the quarterback and the linebacker. The historical data 106 may be player statistics (e.g., a number of sacks, a number of interceptions thrown, a number of interceptions made, a number of rushing yards, etc.) associated with the players. In addition, the historical data 106 may include historical play data about plays run by the offense and/or the defense and their outcomes.

In an example, the computer system 110 includes AI models 112. One of the AI models 112 can process an input to make a prediction about an action (e.g., a linebacker blitzing a quarterback, the quarterback passing, the quarterback rushing, etc.) to be performed by a player during the play. For instance, the input to the AI model can be generated based on the real-time data 104 and the historical data 106 for each of the players. The AI model can then generate an action prediction 114 as an output. As an example, the action prediction 114 may be that the linebacker is going to blitz the quarterback during the play. A video system 120, which may be one or more computer systems that are local to the physical topography 100 or remote from the physical topography 100 can receive the action prediction 114. In a live video stream 122 generated by the video system 120 during the play, a graphical user interface (GUI) element 132A is presented at a user device 130 displaying the video stream 122. The computer system 110 instructs the video system 120 to generate the GUI element 132A based on the action prediction 114. As illustrated in FIG. 1, the GUI element 132A may be a highlighting circle around the linebacker, indicating that the linebacker is predicted to be blitzing the quarterback. Other GUI elements are also possible, such as an arrow pointing to the player predicted to perform the action, an audible output of the prediction, etc.

After an end of the play, the computer system 110 can determine play data 108 associated with the play. For instance, the play data 108 may include a play duration, a down number, yards to go, etc. Another AI model of the AI models 112 can receive an input generated based on the play data 108 and output an indication of a play difficulty 116, corresponding to a predicted difficulty of the play. The input may additionally be based on metrics during the play of various players. The metrics may be included in or generated from the real-time data 104. For instance, the metrics may be associated with the linebacker and may include a quarterback pressure, a time to pressure, and a tight window, which are each described in more detail in FIG. 7. Additional metrics associated with another player (e.g., an open receiver) on the same team as the quarterback may also be included in the input. A player may be determined to be an open receiver based on a set of rules, which are also described in FIG. 7.

The AI model generates the play difficulty 116. A difficulty measurement for a particular player may be determinable from the play difficulty 116. For instance, the play difficulty 116 itself may indicate the difficulty measurement for a particular player (e.g., the quarterback) for a given play, and an overall difficulty measurement for the particular player for multiple plays of the game may be derivable from the play difficulty 116 and the play difficulties determined for the other plays. As an example, the play difficulty 116 may be a number between one and five indicating the difficulty measurement for the quarterback during the play. A higher number can be associated with a more difficult play. The video system 120 can receive the play difficulty 116 (and/or the difficulty measurement) and generate a presentation element 134 at a user device 130 displaying the video stream 122. The presentation element 134 is illustrated as a GUI element. The computer system 110 instructs the video system 120 to generate the presentation element 134 based on the play difficulty 116. As illustrated in FIG. 1, the presentation element 134 may be text indicating the difficulty measurement for the quarterback along with a visual representation (e.g., a gauge) of the difficulty measurement that is presented at the end of the play and before a beginning of the next play.

A user may provide feedback related to the presentation element 134 that can then be sent to the computer system 110. For instance, the feedback may indicate an accuracy of the difficulty measurement or how helpful the presentation element is to the user understanding the game. The computer system 110 may use the feedback to impact subsequent play difficulty determinations as well as to determine when and how often the difficulty measurement is to be shown in the live video stream.

As described herein, in some embodiments, the sensor data and/or video feed data may be respectively transmitted in real-time (or near real-time) to the computer system 110. In one example, real-time means as instantaneously as possible, limited by processing capabilities (e.g., the capability to receive the record data, the capability of the hardware/software to receive/access the record data and perform the transformation, etc.). In another example, real-time means immediately, as it happens (e.g., in the context of a system that processes data, it means processing the data as it is received rather than storing/persisting the data as it is received and processing the data later on). In still another example, real-time means transforming the data without intentional delay, given the processing limitations of the system and the time required to accurately receive the data. In yet another example, real-time means processing/transforming it fast enough to keep up with an input data stream. In an example, near real-time means substantially immediately, where substantially is a measurable latency delay or measurable time interval for an acceptable use experience (e.g., less than one minute, less than ten seconds, etc.). In some embodiments, the data received by the computer system 110 may further be processed in real-time (or near real-time) for subsequent presentation to a user device 130. In some embodiments, the data may not be processed in real-time. For example, the data may be stored to the computer system 110 for later processing. For example, a third-party service and/or the computer system 110 may obtain the data, analyze and/or enhance the data (e.g., generating analytics data from the data), and then provide the resulting data for presentation to the user device 130 at a later time.

In some embodiments, the result(s) of the processing (e.g., an action prediction and/or a difficulty measurement) and/or need not be presented in the live stream itself. For example, an indication of the action prediction and/or difficulty measurement may be presented on a second device, such as an augmented reality device, a virtual reality device, a smartphone, an audio system, etc. In some embodiments, the indication can be embedded in the video in an imperceptible way (e.g., inaudible tone, that the second device uses to determine the indication and the presentation thereof).

Figure 2:
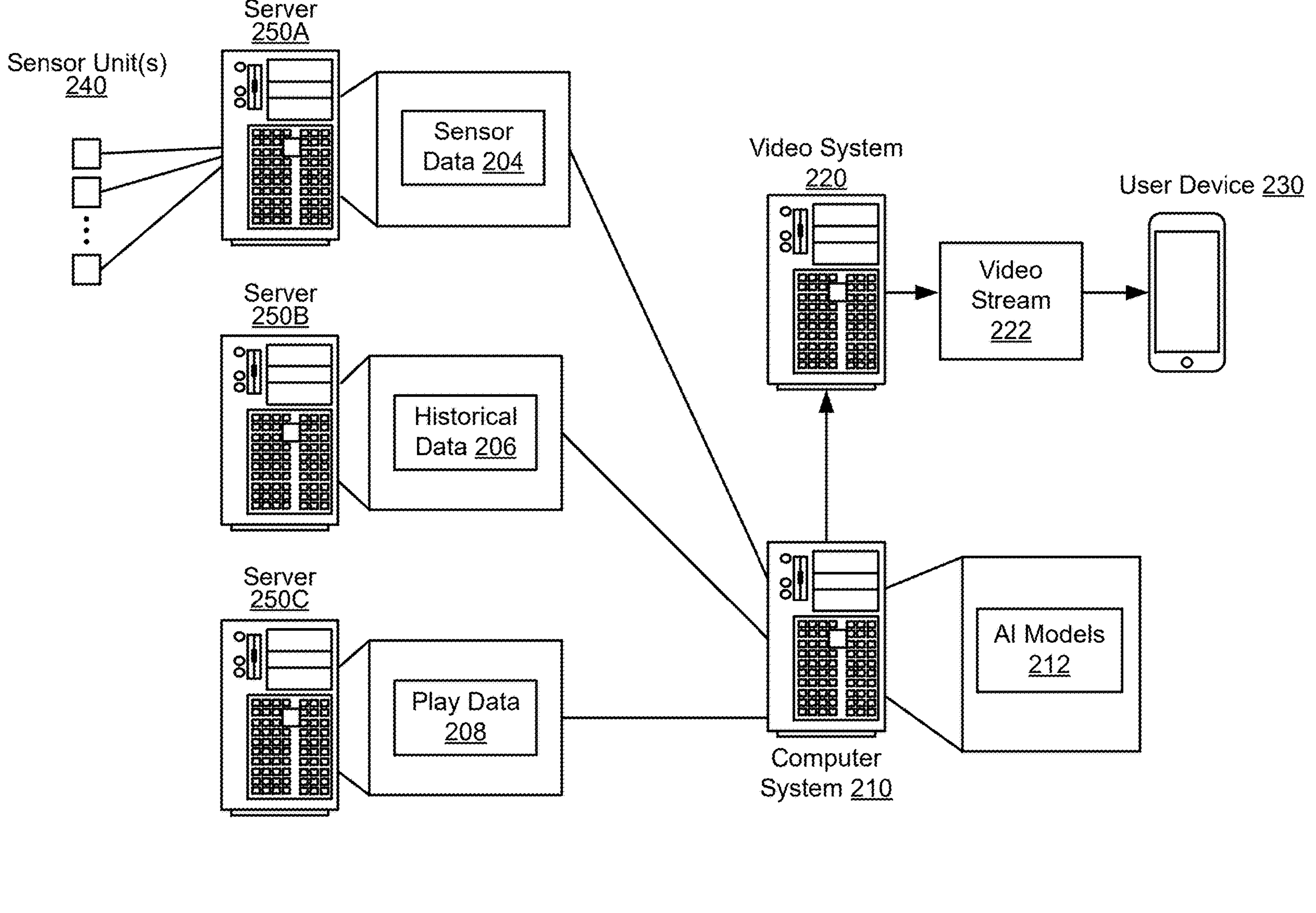
FIG. 2 illustrates a computing system for environment for live stream processing and sensor-based measurement presentation, in accordance with an embodiment of the disclosure.

FIG. 2 illustrates a computing system for environment for live stream processing and sensor-based measurement presentation, in accordance with an embodiment of the disclosure. In some embodiments, one or more sensor units 240 may be physically attached different objects. For example, a player may be physically attached to a sensor unit 240. The sensor unit(s) 240 may be inertial measurement unit (IMU) sensors, which may be included within a wearable device (e.g., a football pads and/or helmet) that is physically attached to the player. It should be understood that any suitable sensor unit may be attached to player (e.g., a radio frequency identification (RFID) tag, a Global Positioning System (GPS) tracker device, etc.), and the sensor unit 240 may be attached to the player at any suitable location and/or via any suitable mechanism (e.g., an ankle strap, attached to glasses, embedded within clothing, etc.). As described herein, a sensor unit 240 may be embedded within another type of device (e.g., a user device), such as a smartwatch or smartphone. In some embodiments, more than one sensor unit 240 may be attached to a given object (e.g., a given player, a ball, etc.). For example, in some embodiments, if an object contains a plurality of component parts (e.g., arms, legs, head, etc.), a different sensor may be attached to one or more of the constituent parts. In some embodiments, depending in part on the type of sensor unit, any suitable sensor data 204 may be generated and/or relayed by the sensor unit 240 (e.g., to computer system 210, described further herein). For example, per player, the sensor data 204 may include a 3D position of the sensor unit 240 (e.g., within a physical topography), a position group of the sensor unit 240, a 3D velocity and/or 3D accelerator of the sensor unit 240, a 3D rotation of the sensor unit 240, a direction of the sensor unit 240, a relative position of the sensor unit 140 to other sensor units of other players, etc. In addition, the football may be physically attached to its own sensor unit 240 (e.g., a GPS tracker, etc.). The sensor data 204 generated for the football may indicate, among other things, a position and/or rotation of the football. In some embodiments, the sensor data 204 may include global data (e.g., GPS coordinates) and/or data relative to the physical topography (e.g., a distance from the attached object to another known object).

In an example, in real-time relative to players being on the field and during a live video stream showing the players, a computer system 210, which is an example of the computer system 110 in FIG. 1, can determine real-time data (e.g., real-time data 104 in FIG. 1). The sensor data 204 may be transmitted from the sensor units 240 to a server 250A that can generate the real-time data based on the sensor data 204. Alternatively, the computer system 210 may receive the sensor data 204 from the sensor units 240 and generate the real-time data.

The computer system 210 can also receive historical data 206 and play data 208. The historical data 206 can be associated with each of the players on the field during a play and can include player statistical data associated with the players. The historical data 206 can be stored in a server 250B to which the computer system 210 can make application programming interface calls to receive the historical data 206. The play data 208 can be associated with the plays performed during the game and/or plays performed during previous games. The play data 208 can include an indication of each player on the field during the play, a motion of each player during the play, an outcome of the play, etc. The play data 208 can be stored in a server 250C to which the computer system 210 can make application programming interface calls to receive the play data 208.

In an example, the computer system 210 includes AI models 212 that receive inputs based on the sensor data 204, the historical data 206, and/or the play data 208 and make predictions and determinations related to the game. Different types of inputs are possible, including the ones described herein and other multimodal inputs such as video, audio, metadata, and/or other data in a multimodal system. For instance, the AI models 212 may predict actions (e.g., blitzing) that are to be performed by players relative to other players and may determine a difficulty of a play. Outputs of the AI models 212, or commands associated with generating presentations associated with the outputs, may be sent to a video system 220, which generates a video stream 222 in real time to the players being on the field. The video stream 222 is sent to a user device 230 and can include GUI elements based on the outputs of the AI models 212. For instance, a first GUI element can indicate the player predicted to perform an action and a second GUI element can indicate the difficulty of the play. The outputs of the AI models 212 may additionally be stored for subsequent use. For instance, the play difficulty may be stored in a data store so that the play difficulties throughout the game can be combined into an overall difficulty measurement for a player during the game.

Figure 3:
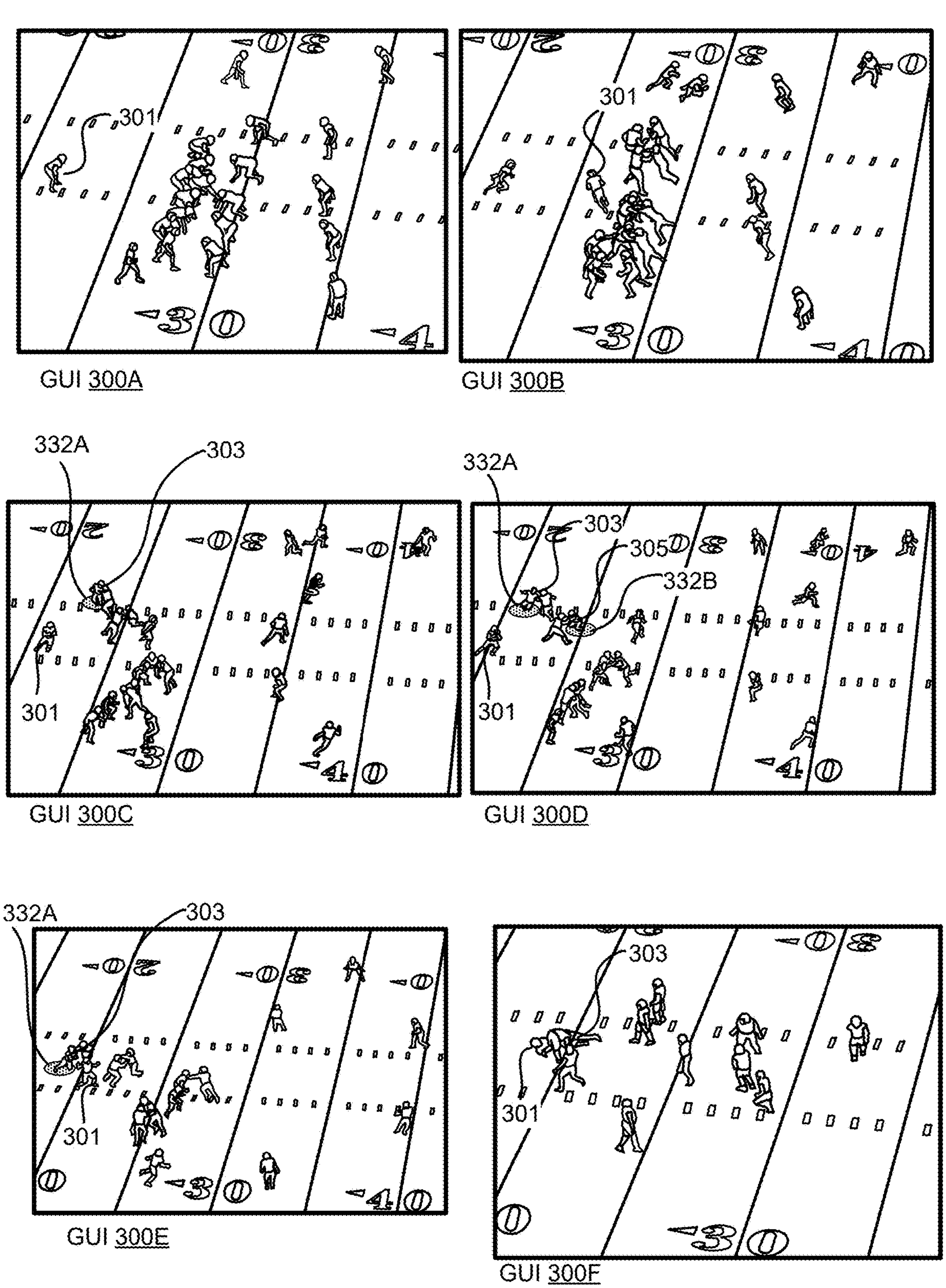
FIG. 3 illustrates example graphical user interfaces during a play shown via a live video stream, in accordance with an embodiment of the disclosure.

FIG. 3 illustrates example GUIs 300A-300F during a play shown via a live video stream, in accordance with an embodiment of the disclosure. GUI 300A shows a start of a play during a live video stream of a football game. At this point, the players are lined up on a line of scrimmage and the ball is about to be snapped to a quarterback. A computer system (e.g., computer system 110 in FIG. 1) receives real-time data from sensors associated with each of the players on the field during the play. The computer system also receives historical data and begins using an AI model predict whether any defensive players are going to blitz the quarterback 301. At this time, the computer system does not predict any defensive players as being a threat to the quarterback 301, so no GUI elements indicating a threat are shown.

In an example, the GUI 300A updates to GUI 300B after one second as the play begins and the players start moving. The quarterback 301 receives the ball and the defensive linemen begin attempting to reach the quarterback 301. The computer system continues processing the sensor data and the historical data at a predefined prediction rate (e.g., ten times per second) to identify threats to the quarterback 301 as the play progresses. For instance, the computer system can determine a start of the play and repeat an execution of the AI model at the predefined prediction rate until determining an end of the play. At this time, the computer system continues to predict that there are no threats to the quarterback.

In an example, after two seconds since the beginning of the play, GUI 300C is presented, which includes a presentation of a GUI element 332A indicating that player 303 is predicted to be a threat to the quarterback 301. The GUI element 332A is a highlight around the player 303. The player 303 may be predicted to be a threat based on one or more executions of the AI model receiving an input real-time data and historical data related to the player 303, the quarterback 301, and the additional players on the field and generating an output predicting that player 303 is blitzing the quarterback 301. As such, the computer system instructs a video system generating the live stream to include the GUI element 332A at the GUI 300C. In FIG. 3, the prediction is illustrated as being binary and resulting in either a highlight or no highlight for each player. In other instances, the prediction may be a percentage likelihood of being a threat to the quarterback and the percentage may be displayed in proximity to the player, rather than the highlight around the player.

In an example, after three seconds since the beginning of the play, GUI 300D is presented, which includes the GUI element 332A indicating that player 303 is still predicted to be a threat to the quarterback 301. In addition, the GUI 300D includes a GUI element 332B indicating that player 305 is also predicted to be a threat to the quarterback 301. The GUI element 332B is a highlight around the player 305. The player 305 may be predicted to be a threat based on the AI model receiving an input real-time data and historical data related to the player 305, the quarterback 301, and the additional players on the field and generating an output predicting that player 305 is blitzing the quarterback 301. As such, the computer system instructs a video system generating the live stream to include the GUI element 332B at the GUI 300D. The GUI element 332A can be presented based on a continued prediction that player 303 is a threat to the quarterback 301, or based on another rule (e.g., a GUI element is to remain presented for 1.5 seconds before being removed) associated with the presentation of the GUI element 332A.

In an example, after five seconds since the beginning of the play, GUI 300E is presented, which includes the GUI element 332A indicating that player 303 is still predicted to be a threat to the quarterback 301. The GUI 300E does not include the GUI element 332B indicating that player 305 is also predicted to be a threat to the quarterback 301. The AI model may continue generating outputs that indicate player 303 is blitzing the quarterback 301, while no longer indicating that player 305 is blitzing the quarterback 301. At the end of the play, GUI 300F is presented. At this point, the live stream shows that the quarterback 301 has been sacked by the player 303.

Figure 4:
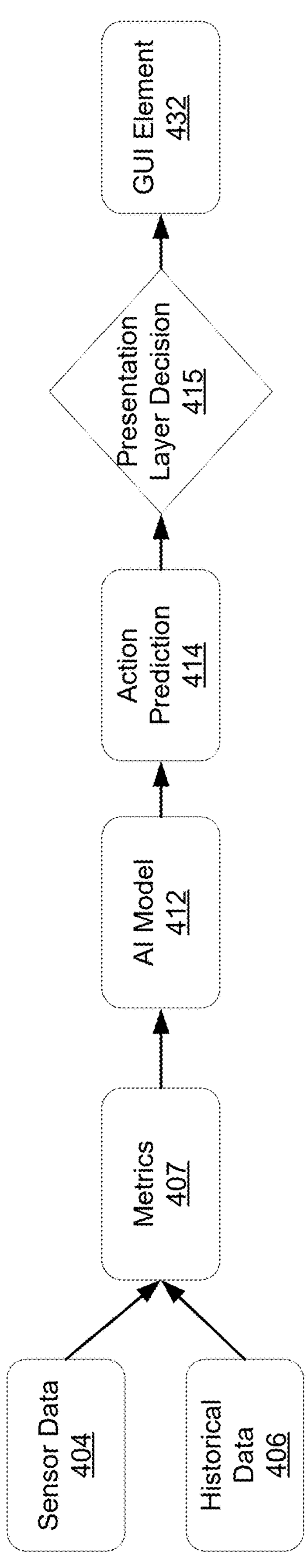
FIG. 4 illustrates an example flow diagram for live stream sensor-based measurement presentation, in accordance with an embodiment of the disclosure.

FIG. 4 illustrates an example flow diagram for live stream sensor-based measurement presentation, in accordance with an embodiment of the disclosure. A computer system (e.g., computer system 110 in FIG. 1) can receive metrics 407 generated from sensor data 404 and historical data 406. The metrics 407 can be generated in real time relative to a live video stream. For each player on a field during a play of the live video stream, the metrics 407 can include one or more of a velocity vector, an acceleration vector, a direction, a position, a position group, an indication of defense or offense, and relative positions to other players. The metrics 407 can also include a ball position and player statistics.

In an example, an AI model 412 of the computer system receives the metrics 407 and outputs an action prediction 414 of an action predicted to be performed by a player. For instance, the action prediction 414 may be a prediction that a linebacker is blitzing a quarterback. The computer system then performs a presentation layer decision 415 and causes a presentation of a GUI element 432 in the live video stream. The GUI element 432 is presented for a time duration until an end of the play or a change to the prediction.

In general, the presentation layer decision 415 involves determining whether the GUI element 432 is to be presented based on one or more rules. For instance, the action prediction 414 may be a numerical indicator between zero and one indicating a likelihood of the action. If the action prediction 414 is above a threshold (e.g., 0.6), then the computer system can determine that the GUI element 432 is to be presented. For subsequent predictions, the computer system can use a different threshold so that the GUI element 432 is not removed for a slight decrease in the likelihood of the action. For instance, the new threshold may be smaller than the original threshold (e.g., 0.3). So, for the GUI element 432 to be removed, a new action prediction needs to be smaller than 0.3. Another rule may be that the presentation of the GUI element 432 is to continue for a predefined amount of time (e.g., one second) even if the likelihood of the action changes. After the predefined amount of time, the presentation of the GUI element 432 can cease.

In an example, the presentation layer decision 415 may involve determining whether the action prediction 414 is predicted for a player that consistently performs the action. For instance, based on statistical play data of the player, the computer system can determine a statistical measure for the player performing the action. If the statistical measure indicates that the player is determined to perform the action greater than a threshold (e.g., 0.6), then the computer system can suppress the GUI element 432 from being presented. This way, players that are determined to uniquely perform the action for the given play can be indicated, rather than players that would be indicated for most plays.

Figure 5:
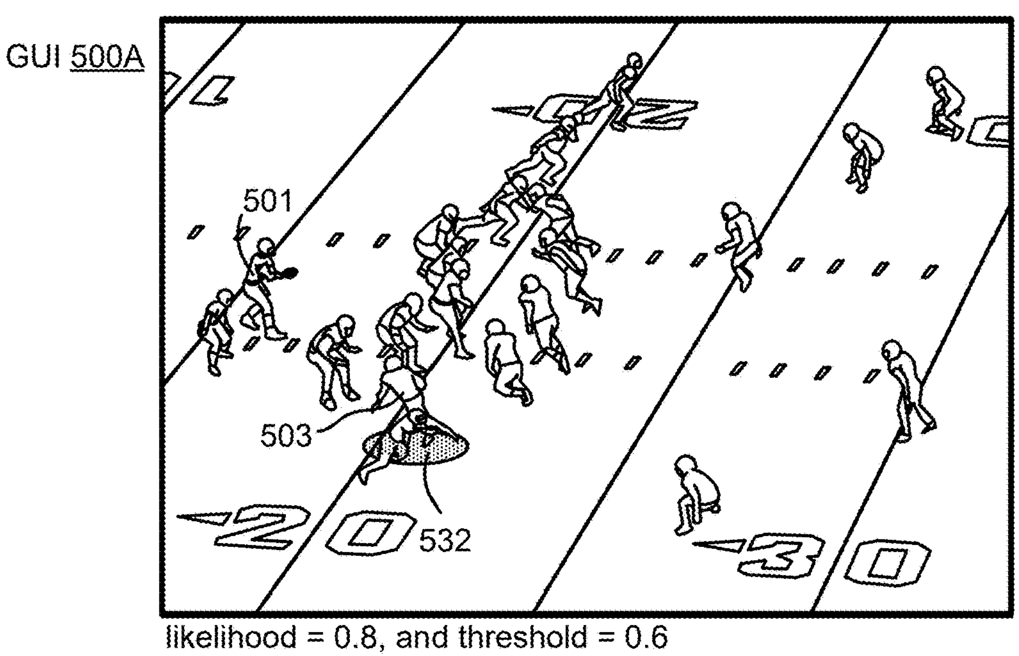
FIG. 5 illustrates example graphical user interfaces associated with a presentation layer decision during a play shown via a live video stream, in accordance with an embodiment of the disclosure.
Figure 5:
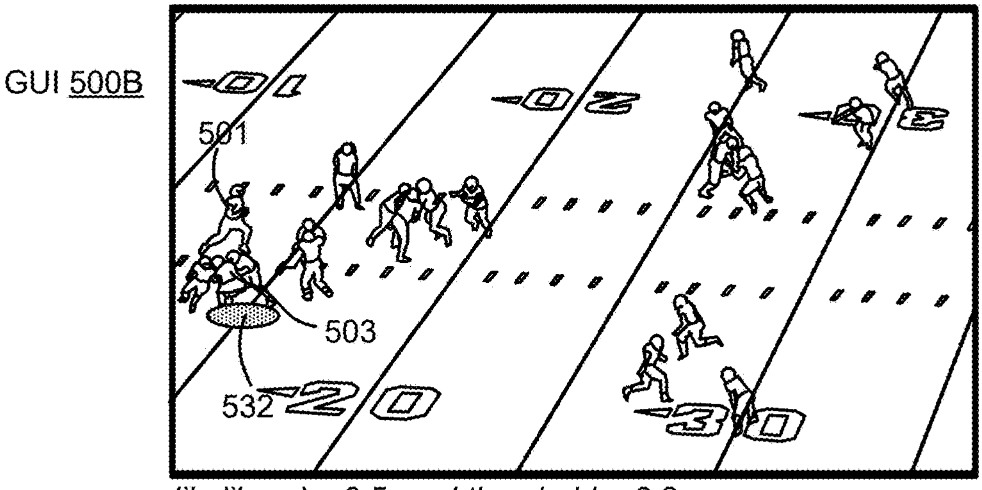
Figure 5:
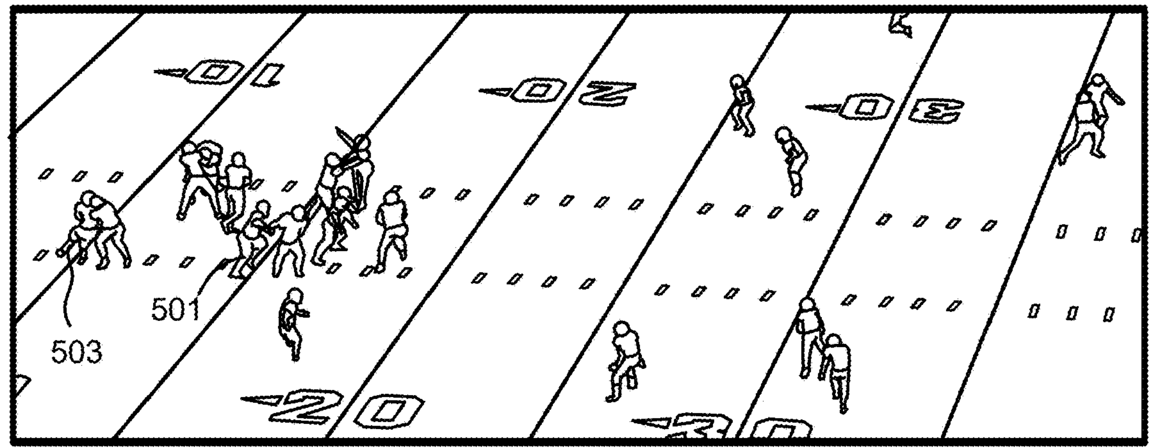

FIG. 5 illustrates example GUIs 500A-500C associated with a presentation layer decision during a play shown via a live video stream, in accordance with an embodiment of the disclosure. GUI 500A includes a presentation of a GUI element 532 associated with player 503. The presentation of the GUI element 532 indicates that the player 503 is predicted to perform an action (e.g., blitzing a quarterback 501), and that the prediction is greater than a threshold. The action prediction is determined by an AI model of a computer system (e.g., computer system 110 in FIG. 1) that receives real-time data and historical data about the players on the field during the play. As illustrated, the likelihood of the player 503 performing the action is determined to be 0.8. The computer system determines whether the GUI element 532 is to be presented by comparing the likelihood to a threshold. As illustrated, the threshold is 0.6. Since the likelihood is greater than the threshold, the computer system determines that the GUI element 532 is to be presented and causes the presentation of the GUI element 532 during the live video stream.

The AI model continues generating action predictions for the player 503 and other players on the field as the play continues. For instance, a second output of the AI model may indicate that player 503 has a likelihood of 0.5 of blitzing the quarterback 501. Since the GUI element 532 has previously been presented, the threshold is reduced to 0.3. So, at this point during the play, the computer system determines that the presentation of the GUI element 532 is to continue at GUI 500B since the likelihood is greater than the threshold.

A third output of the AI model may indicate that player 503 has a likelihood of 0.2 of blitzing the quarterback 501. At this point during the play, the computer system determines that the presentation of the GUI element 532 is to cease at GUI 500C since the likelihood is less than the threshold. Accordingly, the presentation of the GUI element 532 is not presented at the GUI 500C.

Figure 6:
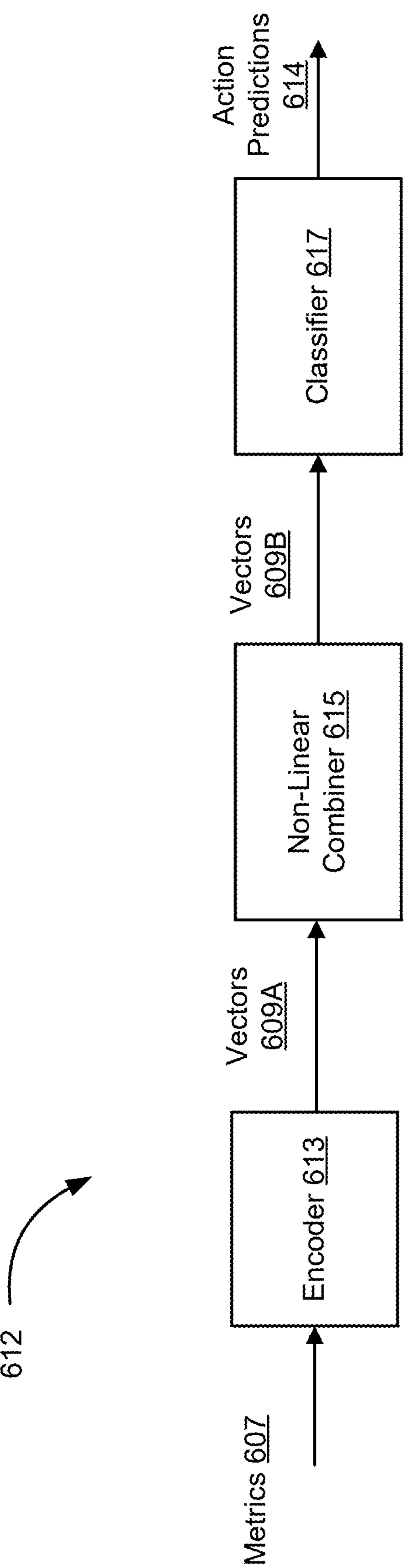
FIG. 6 illustrates an example of an artificial intelligence model for sensor-based measurement predictions, in accordance with an embodiment of the disclosure.

FIG. 6 illustrates an example of an AI model 612 for sensor-based measurement predictions, in accordance with an embodiment of the disclosure. The AI model 612 may be hosted by a computer system (e.g., computer system 110 in FIG. 1) and can include an encoder 613, a non-linear combiner 615, and a classifier 617. The AI model 612 can be trained to predict whether an action is be performed by players in real time during a play of a live video stream. The AI model 612 can be trained based on historical player data and ground truth labels indicating historical occurrences of play actions. Parameters of the AI model 612 can be updated until a loss function is minimized.

In an example, the encoder 613 receives metrics 607 associated with players on the field during the play. The metrics 607 include a vector for each player and include real-time data (e.g., sensor data) and historical data for the players. So, for a football game, the metrics 607 include twenty-two vectors of player data in a first dimensional space. The encoder 613 generates vectors 609A by encoding the metrics 607 into a dimensional space having more dimensions than the first dimensional space of the metrics 607. The vectors 609A include twenty-two vectors that are input into the non-linear combiner 615, which combines the vectors 609A into vectors 609B. The vectors 609B include eleven vectors that are input into the classifier 617, which classifies each of the vectors 609B as to whether the action is predicted. The classifier 617 outputs action predictions 614, which is a set of vectors associated with a team indicating, per player on the team, a classification of whether the player is predicted to perform the action. The classifier 617 may be a binary classifier that outputs a "yes" or "no" for each of the action predictions 614. Alternatively, the classifier 617 may output the likelihoods (e.g., on a scale of zero to one) as the action predictions 614. The computer system can then instruct a remote computer system (e.g., video system 120 in FIG. 1) to show or hide GUI elements per player on the team based on the action predictions 614.

Figure 7:
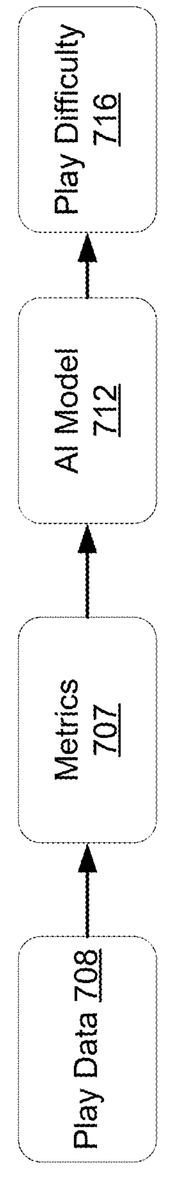
FIG. 7 illustrates an example flow diagram for live video stream play difficulty determination and presentation, in accordance with an embodiment of the disclosure.

FIG. 7 illustrates an example flow diagram for live video stream play difficulty determination and presentation, in accordance with an embodiment of the disclosure. A computer system (e.g., computer system 110 in FIG. 1) can generate metrics 707 from play data 708 about a play during a live video stream of the play. The metrics 407 may be generated for each player on the field during the play. For instance, the metrics 407 for a defensive player may include a quarterback pressure, a time to pressure, and a tight window. The quarterback pressure corresponds to any drop back where the defensive player is within a first predefined distance (e.g., two yards) of the quarterback at pass forward or within a second predefined distance (e.g., 1.5 yards) of the quarterback at any point before the quarterback throws the ball. The time to pressure corresponds to the time measured from a snap of the ball to a first time the defensive player causes pressure to the quarterback. The tight window corresponds to a receiver with less than a predefined distance (e.g., one yard) of separation to the nearest defensive player when a pass arrives.

The metrics 707 may also indicate a number of open receivers on the same team as the quarterback. A player may be determined to be an open receiver based on a set of rules including one or more of the player being beyond a line of scrimmage, the player being a predefined distance (e.g., five yards) from the line to gain, the player having at least a predefined distance (e.g., five yards) of separation from the nearest defensive player, at least a predefined time (e.g., 1.5 seconds) passing since the snap of the ball, and the player being within a predefined distance (e.g., twenty-five yards) of the quarterback horizontally. In addition, the metrics 407 can include a set of properties of the play such as a play duration between a start and an end of the play, a down number, and yards to go.

In an example, an AI model 712 of the computer system receives the metrics 707 and outputs a play difficulty 716 of the play. The AI model 712 can be trained based on historical play data and difficulty annotations. In some instances, the play difficulty 716 may be between one and five and represent a difficulty for the quarterback during the play. The computer system can cause a presentation of a GUI element in the live video stream based on the play difficulty 716. For instance, the presentation may be of the play difficulty 716 or a difficulty measurement determined from the play difficulty. For example, the presentation may be difficulty measurement corresponding to a combination (e.g., average) of the play difficulties determined for a quarterback from every play or a subset of plays in the game.

Figure 8:
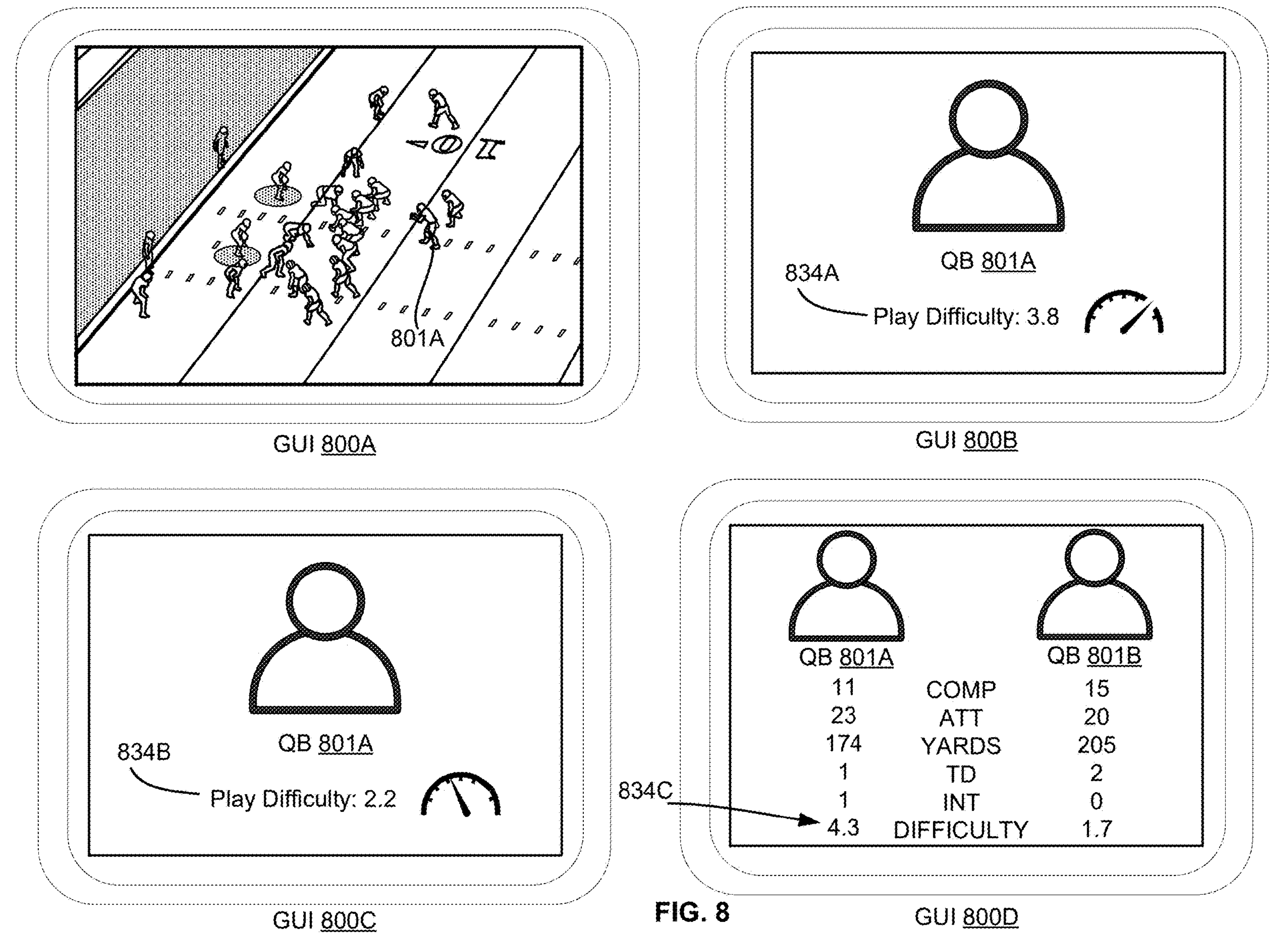
FIG. 8 illustrates example graphical user interfaces during a game shown via a live video stream, in accordance with an embodiment of the disclosure.

FIG. 8 illustrates example GUIs 800A-800D during a game shown via a live video stream, in accordance with an embodiment of the disclosure. GUI 800A shows a start of a play during a live video stream of a football game. At this point, the players are lined up on a line of scrimmage and the ball is about to be snapped to a quarterback 801A. A computer system (e.g., computer system 110 in FIG. 1) receives play data (e.g., metrics 707 in FIG. 7) during the play. At the end of the play, the computer system generates an input to an AI model based on the play data, and the AI model generates an output indicating a difficulty of the play. After the play, the GUI 800B is shown before a next play begins. The GUI 800B includes a GUI element 834A indicating the difficulty of the play for the quarterback 801A. In this case, the difficulty for the quarterback 801A during the play was 3.8. The computer system may determine an update to the difficulty measurement after each play involving the quarterback 801A.

At another point during the live video stream of a game, the computer system can receive play data about a second play involving the quarterback 801A. The computer system can generate a second input to the AI model after the second play to determine a difficulty of the second play. The GUI 800C presents a GUI element 834B of the difficulty of the second play for the quarterback 801A. In this case, the difficulty for the quarterback 801A during the second play was 2.2. The computer system may additionally determine an update to a difficulty measurement for the quarterback 801A. For instance, the computer system may average the play difficulties from the two plays to determine that the difficulty measurement for the quarterback is 3.0.

At some point during the live video stream (e.g., the end of a quarter, halftime, the end of the game, etc.), a GUI 800D may be presented. The GUI 800D includes a presentation of a comparison of statistics between the quarterback 801A and a quarterback 801B that is a different quarterback (e.g., on a different team than) the quarterback 801B. As an example, the GUI 800D may be presented at the end of the game. The GUI 800D also includes a presentation of a GUI element 834C representing a difficulty measurement for each of the quarterbacks 801A-801B throughout the game. To determine the difficulty measurements, the computer system can average the play difficulties of all of the plays for each quarterback during the game. As illustrated, the quarterbacks 801A-801B had similar performance statistics throughout the game, but the difficulty measurement for quarterback 801A was 4.3 and the difficulty measurement for quarterback 801B was 1.7, indicating that the game was more difficult for quarterback 801A.

Figure 9:
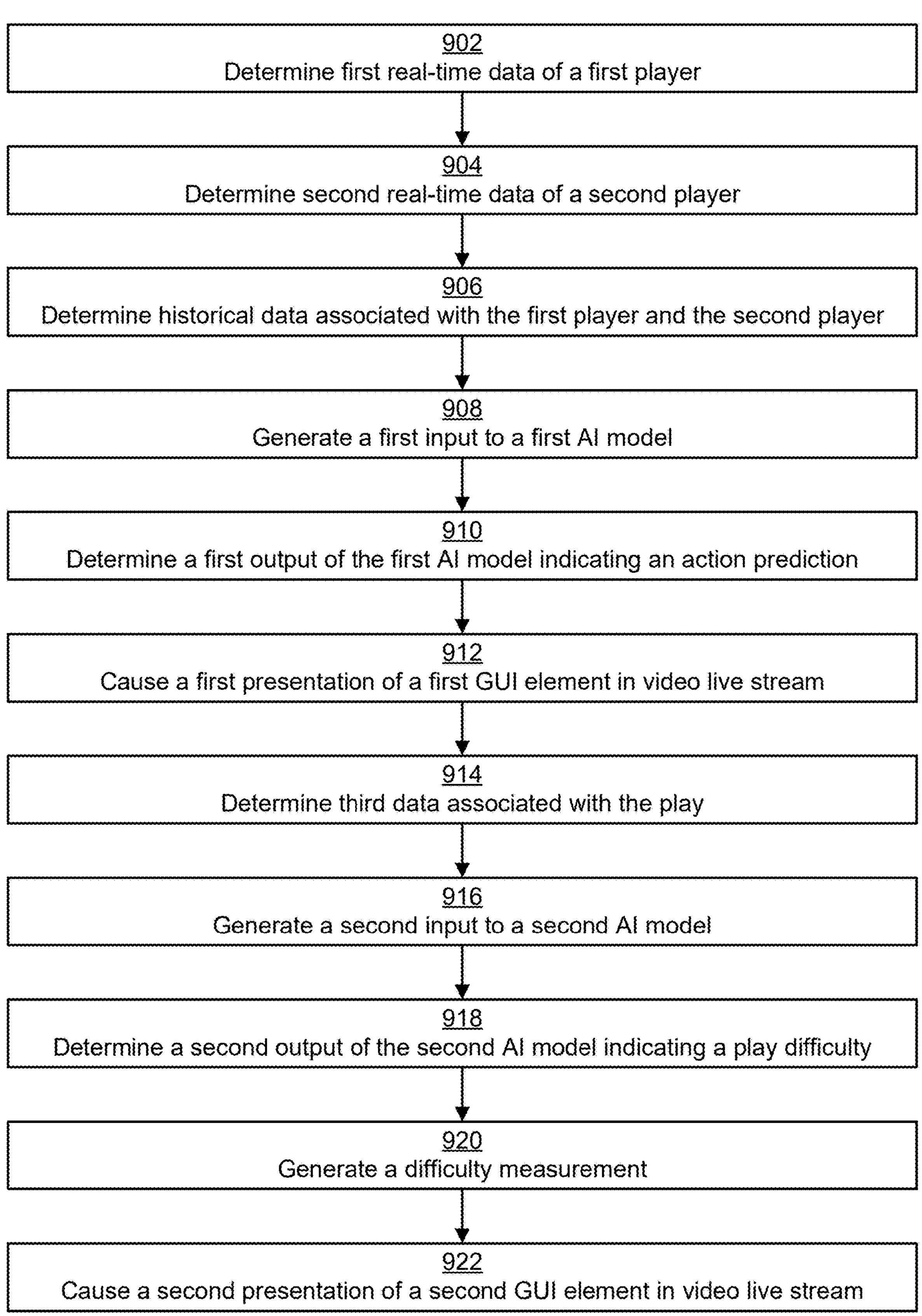
FIG. 9 illustrates an example of a flow for predicting an action of a player and determining a difficulty measurement, in accordance with an embodiment of the disclosure.
Figure 10:
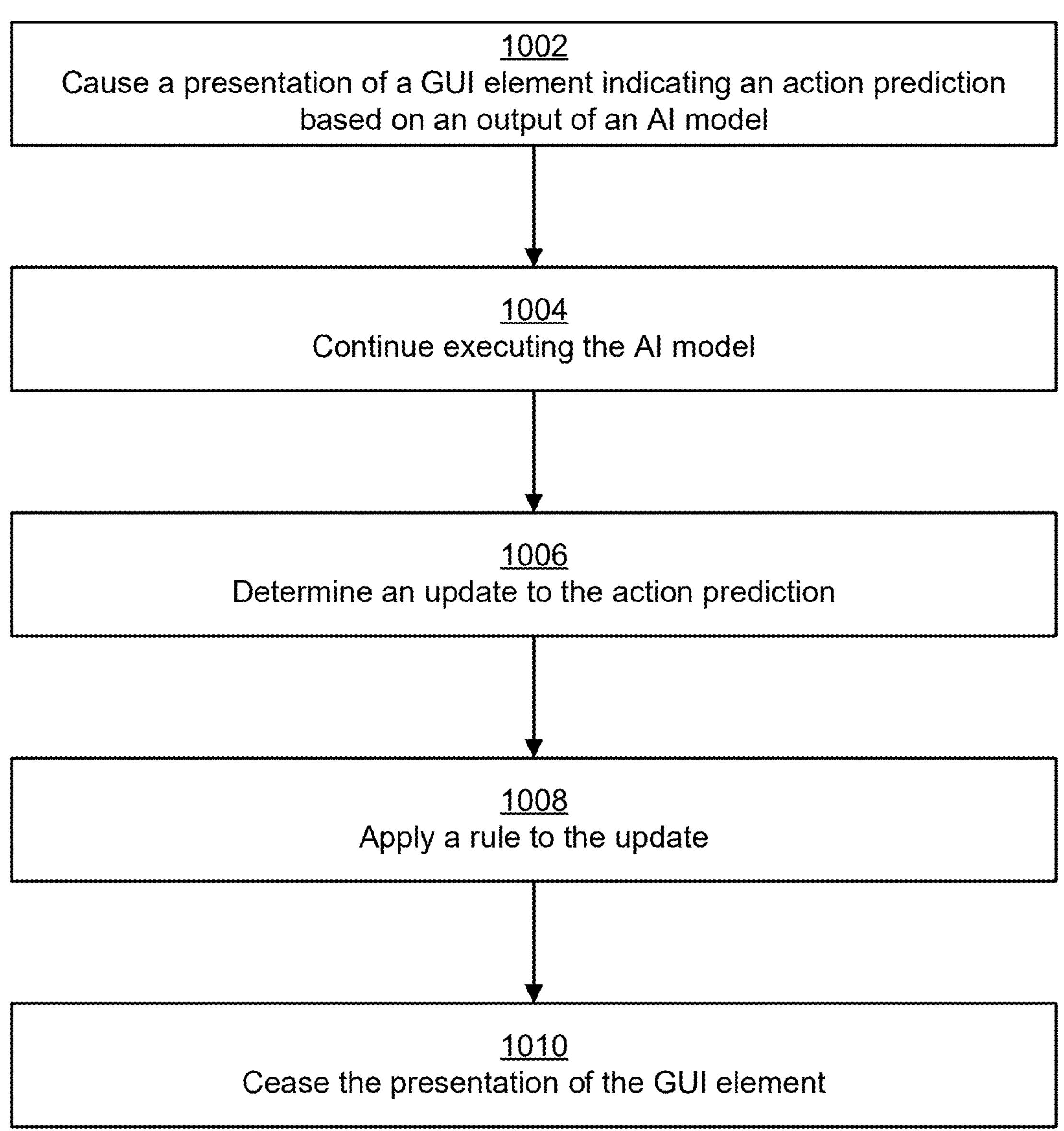
FIG. 10 illustrates an example of a flow for updating presentations of sensor-based measurements, in accordance with an embodiment of the disclosure.
Figure 11:
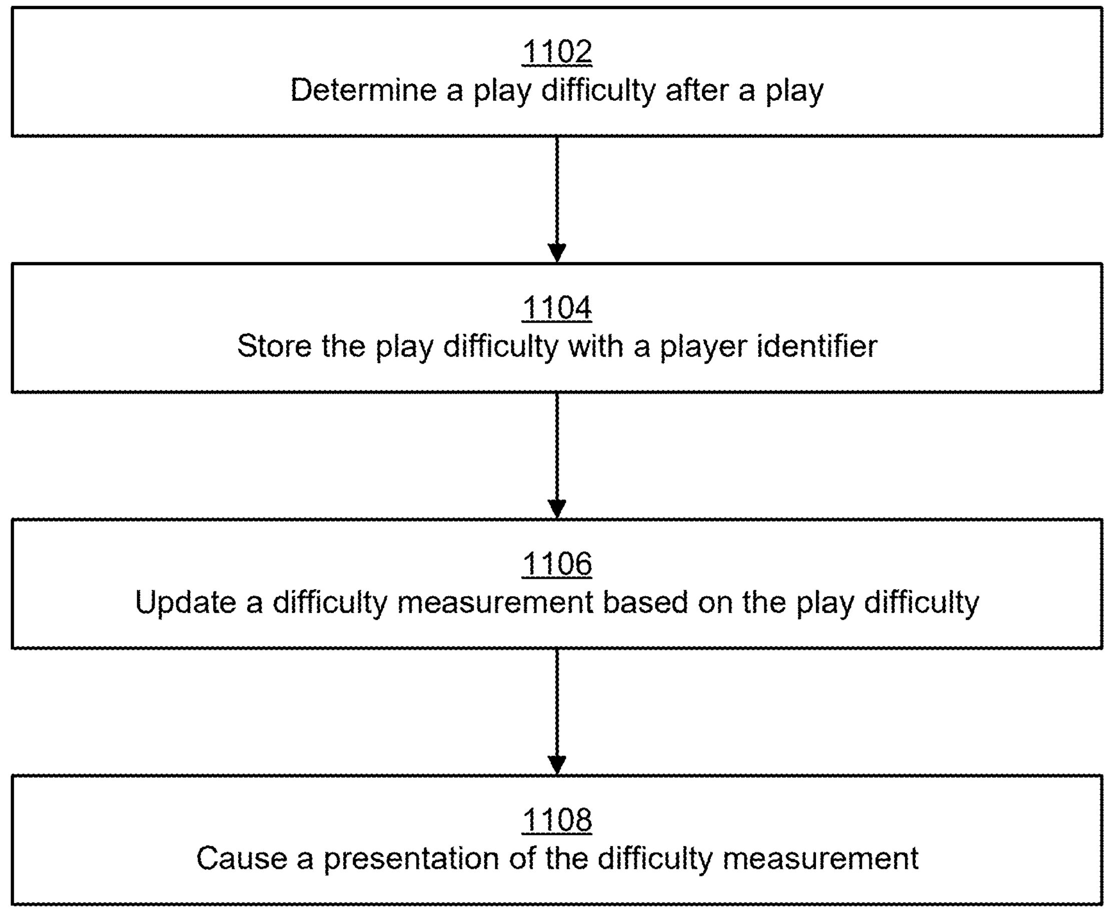
FIG. 11 illustrates an example of a flow for generating difficulty measurements for live video streams, in accordance with an embodiment of the disclosure.

FIGS. 9-11 illustrate flows of processes associated with live-stream processing and sensor-based measurement presentation therein, in accordance with various embodiments. In some embodiments, the processes may be performed by a computer system described herein (e.g., computer system 110 of FIG. 1). The processes (described below) are respectively illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Some or all of the processes (or any other processes described herein, or variations, and/or combinations thereof)

may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

FIG. 9 illustrates an example of a flow for predicting an action of a player and determining a difficulty measurement, in accordance with an embodiment of the disclosure. In an example, the flow includes operation 902, where the computer system determines first real-time data of a first player. The determination is in real time relative to players being on a field and during a live video stream showing the players on the field. The first real-time data can be generated based on first sensor data associated with the first player. The first real-time data can be generated during a play being performed by a second player. For instance, the first player may be a linebacker and the second player may be a quarterback.

In an example, the flow includes operation 904, where the computer system determines second real-time data of a second player. The determination is in real time relative to the players being on the field and during the live video stream. The second real-time data can be generated during the play based on second sensor data associated with the second player.

In an example, the flow includes operation 906, where the computer system determines historical data for the first player and the second player. The historical data includes first historical data associated with the first player and second historical data associated with the second player. The computer system may use player identifiers that are unique to each of the first player and the second player to make application programming calls to a server that stores the historical data. The historical data includes player statistics of the first player and the second player.

In an example, the flow includes operation 908, where the computer system generates a first input to a first AI model. The first input is generated during the play based on the first real-time data, the first historical data, the second real-time data, and the second historical data. The first AI model may include an encoder, a non-linear combiner, and a classifier, as described in FIG. 6.

In an example, the flow includes operation 910, where the computer system determines a first output of the first AI model indicating an action prediction. The first output is based on the first input and indicates a prediction of an action to be performed by the first player relative to the second player during the play. For instance, the action prediction may indicate that the first player is likely to blitz the second player.

In an example, the flow includes operation 912, where the computer system causes a first presentation of a first GUI element in the video live stream. The presentation is caused based on the prediction and indicates that the action is predicted to be performed by the first player. The presentation occurs during the play.

In an example, the flow includes operation 914, where the computer system determines third data associated with the play. The third data includes metrics during the play associated with the first player, metrics during the play associated with a third player on a same team as the second player, and a set of properties (e.g., yards to go, down, duration) of the play. The third data is determined after an end of the play.

In an example, the flow includes operation 916, where the computer system generates a second input to a second AI model. The second input is generated based on the third data.

In an example, the flow includes operation 918, where the computer system determines a second output of the second AI model indicating a play difficulty. The second output is based on the second input.

In an example, the flow includes operation 920, where the computer system generates a difficulty measurement. The difficulty measurement is generated based on the second output and corresponds to the second player. That is, the difficulty measurement can indicate a difficulty of the play for the quarterback.

In an example, the flow includes operation 922, where the computer system causes a second presentation of a second GUI element in the video live stream. The second GUI element indicates the difficulty measurement. The second GUI element can be updated after each play for the second player.

FIG. 10 illustrates an example of a flow for updating presentations of sensor-based measurements, in accordance with an embodiment of the disclosure. In an example, the flow includes operation 1002, where the computer system causes a presentation of a GUI element indicating an action prediction based on an output of an AI model. The AI model can generate the action prediction based on real-time data during a play of a live video stream. The action prediction indicates a prediction of an action to be performed by a first player relative to a second player during the play. For instance, the action prediction may indicate that there is a likelihood of 0.7 that the first player is going to blitz the second player.

In an example, the flow includes operation 1004, where the computer system continues executing the AI model. The AI model can be executed between a start of the play and an end of the play at a predefined prediction rate such that multiple outputs are generated. The output may be generated based on a first execution of the AI model and a second output can be generated based on a second execution of the AI model after the first execution and during the play.

In an example, the flow includes operation 1006, where the computer system determines an update to the action prediction. The second output can indicate that the likelihood of the first player blitzing the second player is 0.2.

In an example, the flow includes operation 1008, where the computer system applies a rule to the update. The rule may be a duration of presentation the GUI element or a change in thresholds for presenting the GUI element. For instance, the rule may be that originally the likelihood to cause the presentation of the GUI element is 0.5, and once the GUI element is presented, the threshold drops to 0.25. So, the computer system can compare the updated likelihood to the 0.25 threshold.

In an example, the flow includes operation 1010, where the computer system ceases the presentation of the GUI element. Since the likelihood of 0.2 is below the 0.25 threshold, the computer system ceases the presentation of the GUI element.

FIG. 11 illustrates an example of a flow for generating difficulty measurements for live video streams, in accordance with an embodiment of the disclosure. In an example, the flow includes operation 1102, where the computer system determines a play difficulty after a play. The play difficulty can be determined by inputting play data about the play into an AI model.

In an example, the flow includes operation 1104, where the computer system stores the play difficulty with a player identifier. The play difficulty can represent the difficulty of the play for a particular player (e.g., quarterback), so the computer system can store the play difficulty with the player identifier of the particular player.

In an example, the flow includes operation 1106, where the computer system updates a difficulty measurement based on the play difficulty. The difficulty measurement may be an average of the play difficulties determined for the player throughout a live video stream, or across multiple live video streams. So, upon determining the play difficulty for the play, the computer system can recalculate the difficulty measurement for the player.

In an example, the flow includes operation 1108, where the computer system causes a presentation of the difficulty measurement. The difficulty measurement may be presented as a GUI element between plays during the live video stream. The presented difficulty measurement may correspond to one play, a set of plays, or an entirety of plays during the video live stream. So, as the live video stream progresses, the difficulty measurement can be continually updated and presented to reflect the ongoing difficulty for the player.

Figure 12:
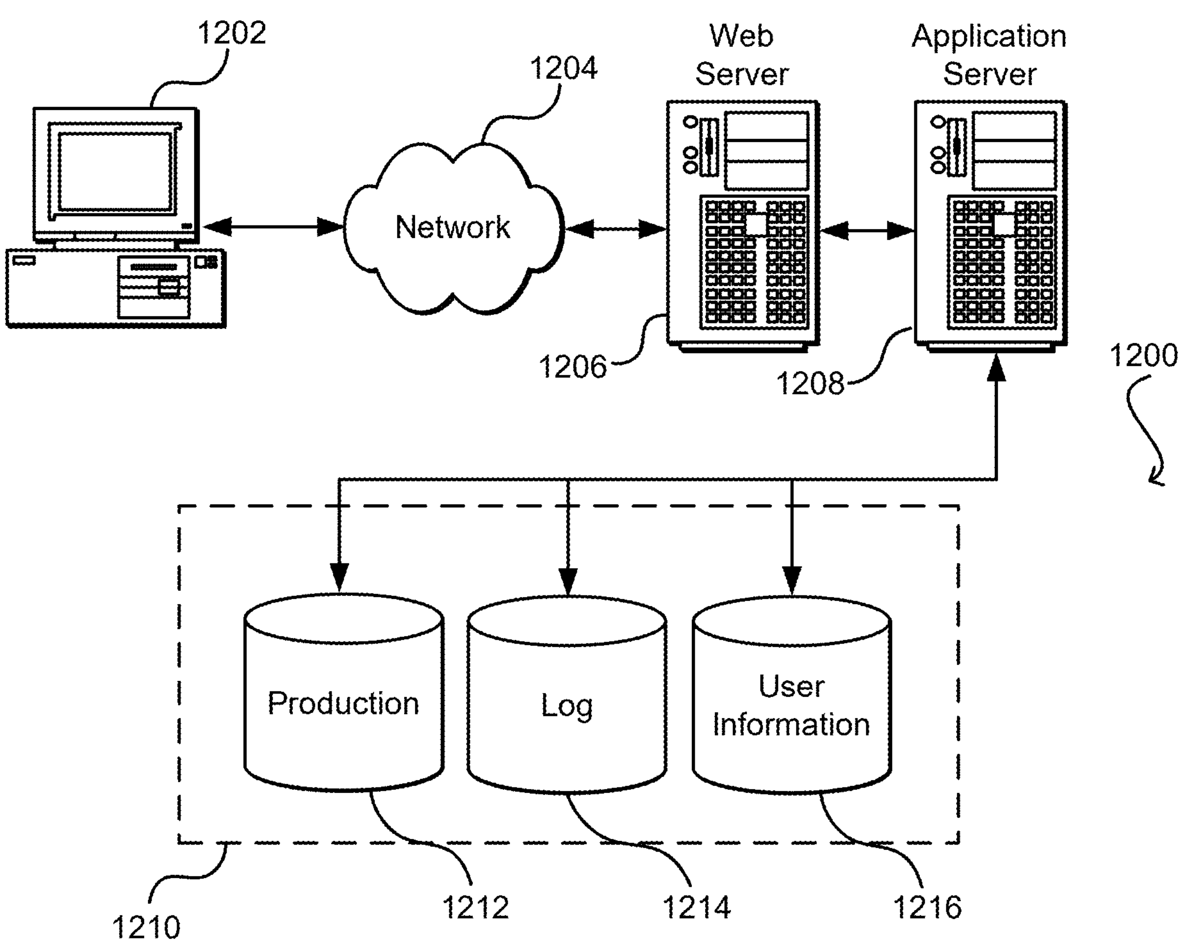
FIG. 12 illustrates aspects of an example environment for implementing aspects in accordance with various embodiments.

FIG. 12 illustrates aspects of an example environment 1200 for implementing aspects in accordance with various embodiments. As will be appreciated, although a Web-based environment is used for purposes of explanation, different environments may be used, as appropriate, to implement various embodiments. The environment includes an electronic client device 1202, which can include any appropriate device operable to send and receive requests, messages, or information over an appropriate network 1204 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1206 for receiving requests and serving content in response thereto, although for other networks an alternative device serving a similar purpose could be used as would be apparent to one of ordinary skill in the art.

The illustrative environment includes at least one application server 1208 and a data store 1210. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1202 and the application server 1208, can be handled by the Web server. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log data 1214, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1202. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system comprising:

one or more processors; and one or more memory storing instructions that, upon execution by the one or more processors, configure the system to:

determine, in-real time relative to players being on a field and during a live video stream showing the players on the field, first real-time data of a first player, the first real-time data generated based at least in part on a first sensor associated with the first player, the first real-time data generated during a play being performed by a second player;

determine, in real-time relative to the players being on the field and during the live video stream, second real-time data of the second player, the second real-time data generated during the play based at least in part on a second sensor associated with the second player;

determine first historical data associated with the first player;

determine second historical data associated with the second player;

generate, during the play, a first input to a first artificial intelligence model based at least in part on the first real-time data, the first historical data, the second real-time data, and the second historical data;

determine a first output of the first artificial intelligence model, the first output being based at least in part on the first input and indicating a prediction of an action to be performed by the first player relative to the second player during the play;

cause, based at least in part on the prediction, a first presentation of a first graphical user interface element in the live video stream during the play, the first graphical user interface element indicating that the action is predicted to be performed by the first player;

determine, after an end of the play, third data associated with the play;

generate a second input to a second artificial intelligence model based at least in part on the third data;

determine a second output of the second artificial intelligence model, the second output being based at least in part on the second input and indicating a difficulty of the play;

generate, based on the second output, a difficulty measurement for the second player; and cause a second presentation of a second graphical user interface element in the live video stream, the second graphical user interface element indicating the difficulty measurement.

2. The system of claim 1, wherein the first input comprises a set of vectors indicating a ball position and, per player, a player statistic and at least one of: a velocity, an acceleration, a direction, a position, a position group, an indication of offense or defense, or a relative player position.

3. The system of claim 1, wherein the first output comprises a set of vectors associated with a team indicating, per player on the team, a classification of whether the player is predicted to perform the action or a likelihood of the classification, and wherein causing the first presentation comprises instructing a remote computer system configured to present the live video stream to show or hide the first graphical user interface element per player on the team.

4. The system of claim 1, wherein the second input indicates a first set of metrics during the play of the first player, a second set of metrics during the play of a third player on a same team as the second player, and a third set of properties of the play.

5. A computer-implemented method comprising:

determining, in-real time relative to a first player being in a physical space, first real-time data of the first player, the first real-time data generated during a play in the physical space by at least using one or more sensors also present in the physical space;

generating, during the play, a first input to a first artificial intelligence model based at least in part on the first real-time data;

determining a first output of the first artificial intelligence model, the first output being based at least in part on the first input and indicating a prediction of an action to be performed by the first player during the play in the physical space;

repeating execution of the first artificial intelligence model during the play such as a plurality of outputs of the first artificial intelligence model is generated;

causing, based at least in part on the prediction, a first presentation of a first user interface element during the play, the first user interface element indicating the prediction, the first presentation updated during the play based at least in part on the plurality of outputs; and determining a start and an end of the play, wherein the execution of the first artificial intelligence model is repeated at a predefined prediction rate between the start and the end such that the plurality of outputs of the first artificial intelligence model is generated at the predefined prediction rate.

6. The computer-implemented method of claim 5, further comprising:

determining, after an end of the play, second data associated with the play;

generating a second input to a second artificial intelligence model based at least in part on the second data;

determining a second output of the second artificial intelligence model, the second output being based at least in part on the second input and indicating a difficulty of the play;

generating, based at least in part on the second output, a difficulty measurement for a player that performed the play, the player being the first player or a second player; and causing a second presentation of a second user interface element indicating the difficulty measurement.

7. The computer-implemented method of claim 5, further comprising:

determining, in real-time relative to players being in the physical space and during a live video stream showing players, second real-time data of a second player, the second real-time data generated during the play based at least in part on a sensor associated with the second player, wherein the second real-time data is determined by at least being received from the sensor or from a first server that receives sensor data of the sensor and generates the second real-time data from the sensor data;

determining first historical data associated with the first player; and determining second historical data associated with the second player, wherein the first historical data and the second historical data are determined based at least in part on one or more application programming interface calls to a second server storing player statistical data, wherein the first input is generated further based at least in part on the first historical data, the second real-time data, and the second historical data, and wherein the first user interface element is caused to be presented in the live video stream.

8. The computer-implemented method of claim 5, wherein the first output is generated based at least in part on a first execution of the first artificial intelligence model during the play, wherein a second output of the first artificial intelligence model is generated based at least in part on a second execution of the first artificial intelligence model after the first execution and during the play, wherein the second output of the first artificial intelligence model indicates a change to the prediction.

9. The computer-implemented method of claim 8 further comprising:

determining, from the first output, a first likelihood of the action;

determining that the first likelihood exceeds a first threshold, wherein the first user interface element is caused to be presented based at least in part on the first likelihood exceeding the first threshold;

determining, based at least in part on the first likelihood exceeding the first threshold, a second threshold to use in association with ceasing the first presentation prior to the end of the play;

determining, from the second output, a second likelihood of the action;

determining that the second likelihood is smaller than the second threshold, wherein the change indicates that the action is no longer predicted to be performed by the first player based at least in part on the second likelihood being smaller than the second threshold; and causing the first presentation to cease.

10. The computer-implemented method of claim 8, wherein the change indicates that the action is no longer predicted to be performed by the first player, and wherein the computer-implemented method further comprises:

causing, after the second output is generated, the first presentation to continue for a predefined amount of time; and causing, after the predefined amount of time and based at least in part on the change, the first presentation to cease.

11. The computer-implemented method of claim 5 further comprising:

determining that the first output indicates that the action is also predicted for a second player during the play; and suppressing an indication of the action from being presented in association with the second player.

12. The computer-implemented method of claim 11 further comprising:

determining, based at least in part on statistical play data of the second player, a statistical measure for the second player performing the action, wherein the suppressing is based at least in part on the statistical measure.

13. One or more computer-readable storage media storing instructions that, upon execution on a system, cause the system to perform operations comprising:

determining, after an end of a play by a first player that is present in a physical space, first data associated with the play in the physical space, the first data generated by at least using one or more sensors also present in the physical space;

generating a first input to a first artificial intelligence model based at least in part on the first data, the first artificial intelligence model trained based at least in part on historical play data and play difficulty data;

generating a second input to a second artificial intelligence model based at least in part on second real-time data of a second player, wherein the second artificial intelligence model is trained based at least in part on historical player data and ground truth labels indicating historical occurrences of play actions;

determining a first output of the first artificial intelligence model and a second output of the second artificial intelligence model, the first output being based at least in part on the first input and indicating a difficulty of the play, the second output being based at least in part on the second input and indicating a prediction of an action to be performed by the second player;

generating, based at least in part on the first output, a difficulty measurement for the first player; and causing a first presentation of a first presentation element indicating the difficulty measurement and a second presentation of a second element indicating the prediction.

14. The one or more computer-readable storage media of claim 13 storing further instructions that, upon execution on the system, cause the system to perform further operations comprising:

determining, in-real time relative to the second player being in the physical space, the second real-time data of the second player, the second real-time data generated during the play.

15. The one or more computer-readable storage media of claim 14, wherein the second input is expressed in a first dimensional space, wherein the second output is generated by at least:

generating first vectors by encoding, by the second artificial intelligence model, the second input into a second dimensional space having more dimensions than the first dimensional space;

combining, by the second artificial intelligence model, the first vectors into second vectors; and classifying, by the second artificial intelligence model, each second vector of the second vectors as to whether the action is predicted based at least in part on the second vector.

16. The one or more computer-readable storage media of claim 14, wherein causing the second presentation comprises causing a graphical user interface element to be presented in a live video stream in association with a presentation of the second player in the live video stream, wherein the graphical user interface element is presented for a time duration until an end of the play or a change to the prediction.

17. The one or more computer-readable storage media of claim 14, wherein the second real-time data is determined by at least being received, by the system that is an on-premise system, from a sensor associated with the second player or from a first server that receives sensor data of the sensor and generates the second real-time data from the sensor data, and wherein causing the second presentation comprises instructing a remote video system to present the second presentation element.

18. The one or more computer-readable storage media of claim 13, wherein the play is a first play, and wherein the one or more computer-readable storage media store further instructions that, upon execution on the system, cause the system to perform further operations comprising:

determining, after an end of a second play by the first player, second data associated with the second play;

generating a second input to the first artificial intelligence model based at least in part on the second data;

generating, based at least in part on a second output of the first artificial intelligence model in response to the second input, an update to the difficulty measurement for the first player; and causing a second presentation of a second presentation element indicating the update.

19. The one or more computer-readable storage media of claim 18, wherein the first presentation is presented after the end of the first play and before a start of the second play, and wherein the second presentation is presented after the end of the second play.

20. The computer-implemented method of claim 5, wherein the first real-time data corresponds to a sports event at the physical space, and wherein the first presentation is presented as a live video stream of the sports event to a device of a remote viewer of the sports event other than the first player.

* * * * *